E. J. LANE.
ELECTRIC AUTOMATIC WEIGHING DEVICE.
APPLICATION FILED APR. 27, 1914.

1,115,690.

Patented Nov. 3, 1914.
3 SHEETS—SHEET 1.

WITNESSES:

INVENTOR

BY

HIS ATTORNEY

E. J. LANE.
ELECTRIC AUTOMATIC WEIGHING DEVICE.
APPLICATION FILED APR. 27, 1914.

1,115,690.

Patented Nov. 3, 1914.
3 SHEETS—SHEET 2.

WITNESSES:
John A. Naismith
J. B. Cambers

INVENTOR
Enoch J. Lane
BY R. L. Bates
HIS ATTORNEY

E. J. LANE.
ELECTRIC AUTOMATIC WEIGHING DEVICE.
APPLICATION FILED APR. 27, 1914.

1,115,690.

Patented Nov. 3, 1914.

WITNESSES:
John A. Naismith
J. B. Cambers

INVENTOR
Enoch J. Lane
BY R. C. Bates
HIS ATTORNEY

UNITED STATES PATENT OFFICE.

ENOCH J. LANE, OF SAN JOSE, CALIFORNIA, ASSIGNOR OF ONE-THIRD TO LEE I. JONES, OF SAN JOSE, CALIFORNIA.

ELECTRIC AUTOMATIC WEIGHING DEVICE.

1,115,690.  Specification of Letters Patent.  Patented Nov. 3, 1914.

Application filed April 27, 1914. Serial No. 834,713.

*To all whom it may concern:*

Be it known that I, ENOCH J. LANE, a citizen of the United States, residing at San Jose, in the county of Santa Clara and State of California, have invented certain new and useful Improvements in an Electric Automatic Weighing Device, of which the following is a specification.

My invention relates to an electric automatic weighing device, and more particularly to that general class known as self weighing scales.

The object of my invention is to provide an electric automatic weighing device of simple and durable construction, capable of being used for depositing syrup in cans of required weight, automatic in action, or for weighing any other packages that require the same weight in each package without the necessity of disturbing the arrangement of the scale beam or in any manner altering or changing the construction thereof.

A further object of my invention is to provide novel means for supplying the cans or packages to and from said weighing device, as the same are filled with the material used, to the required weight set on said scale beam automatic in action, and also shutting off the supply of material with which said cans or packages are filled during the changing of said cans or packages, automatic in action.

Further objects and advantages will appear in the following description, it being understood that various changes in form, proportions and minor details of construction may be resorted to within the scope of the appended claims.

Figure 1:
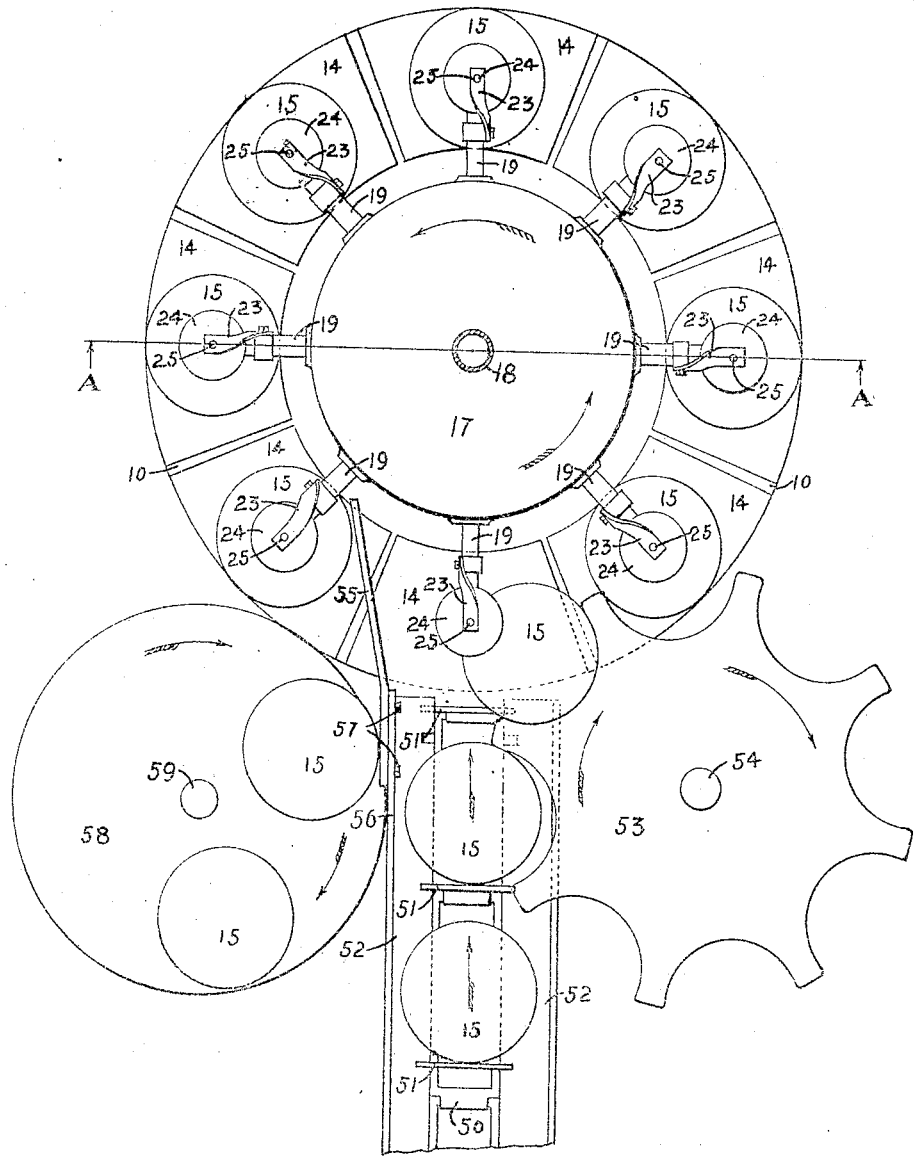
Figure 2:
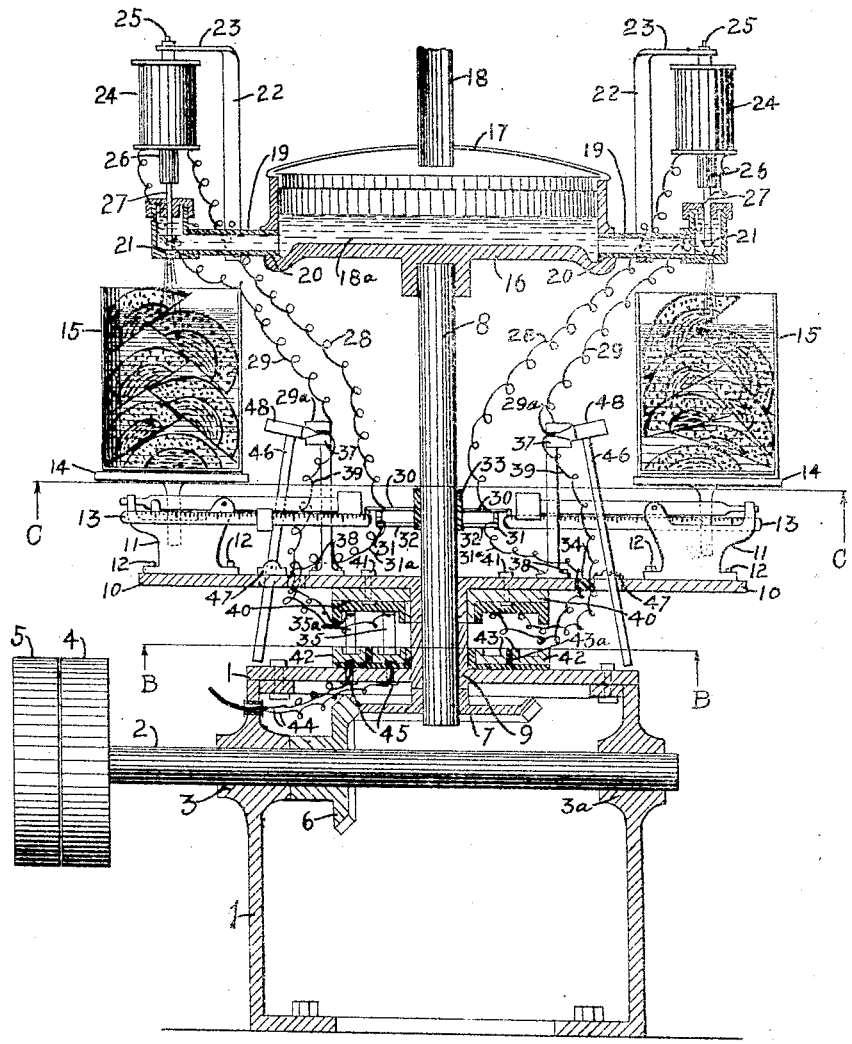
Figure 3:
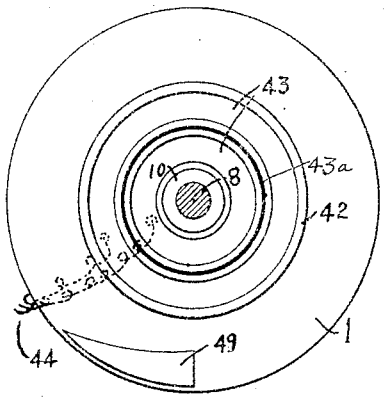
Figure 4:
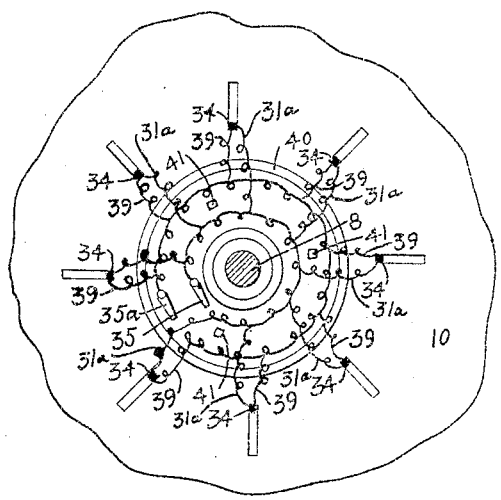
Figure 5:
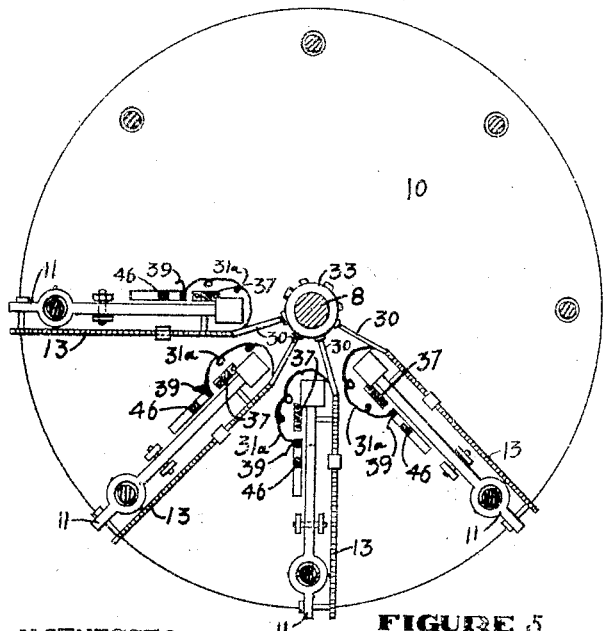
Figure 6:
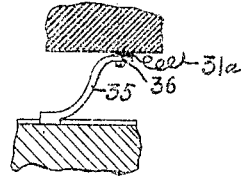

For a full understanding of my invention and the merits thereof, reference is to be had to the following description and accompanying drawings, in which:

Figure 1 is a plan view of my electric automatic weighing device. Fig. 2 is a section on line A—A of Fig. 1. Fig. 3 is a section on line B—B of Fig. 2. Fig. 4 is a bottom plan view of scale platform, parts being broken away. Fig. 5 is a section on line C—C of Fig. 2, parts being broken away. Fig. 6 is a detail elevation of traveling spring contact.

Corresponding and like parts are referred to in the following description and indicated in all the views of the drawings by the same reference characters.

The improved electric automatic weighing device forming the subject matter of the present invention comprises a main frame 1 to which is attached driving shaft 2, the same being held in place by bearings 3 and 3ᵃ which are integral parts of frame 1 in which said shaft 2 rotates. Near the outer end of, and keyed to, said shaft 2 is driving pulley 4. Loose pulley is shown at 5 the same runs loose on shaft 2 and is for the purpose of shifting the power belt off and on to pulley 4 as required. Keyed to shaft 2 is bevel-gear 6 connecting with bevel-gear 7 which is keyed to upright shaft 8, said shaft being held in place by bearing 9 and rotates therein. Said bearing is an integral part of frame 1. Keyed to upright shaft 8 is scale platform 10, the same rotating therewith. Fastened to said scale platform 10 are a plurality of weighing scales 11 held in place on said platform 10 by bolts shown at 12. A plurality of scale beams are shown at 13. Attached to said scale beams are a plurality of receiving platforms 14. On said receiving platforms 14 are shown a plurality of fruit cans 15 in position ready to be filled with syrup to the required weight. Keyed to the upper end of shaft 8 is a circular revolving reservoir 16 which may be made of cast iron or any other suitable material having a cover over the top thereof, shown at 17, through which is inserted a supply pipe 18. Said supply pipe 18 is for the purpose of supplying syrup 18ᵃ or any other article being used in reservoir 16, said pipe being stationary and feeding from a source not shown.

A plurality of supply pipes 19 are shown connected to circular revolving reservoir 16 at 20. On the outer ends of said supply pipes 19 are connected a plurality of supply valves 21. These valves are for the purpose of regulating the supply of syrup 18ᵃ or any other article being used to fill cans or packages placed thereunder. Fastened to pipes 19 are a plurality of perpendicular arms 22. These arms are made of iron of the required width, length and thickness, the upper ends of said arms 22 being bent at right angles a distance as shown at 23 to which is suspended a plurality of electromagnets 24 by bolts shown at 25, said magnets being insulated therefrom. In connection with said magnets 24 are a plurality of plungers 26. Fastened to said plungers 26 are a plurality of valve stems 27 which are for the purpose of closing and opening said supply valves 21 as the electric current is applied to said magnets 24 through wires 28 and 29, said wires 28 connecting with spring contact 30 which connects with the inner end of said scale beams 13. When the required weight is deposited in can or package the scale beams 13 will balance and break the spring contact 30, when plungers 26 will drop down closing valves 21 and thus stopping the flow of syrup 18ª or any other article being used to fill cans or packages placed thereunder. A plurality of wire connections are shown at 31 connecting a plurality of wires 31ª with a plurality of contacts 32. Said contacts 30 and 32 are fastened to hub 33 and are insulated therefrom, said hub 33 being keyed to shaft 8 and revolves therewith, said wires 31ª passing through insulation 34 in scale platform 10 and are connected with rotating springs 35 at 36, Fig. 6. A plurality of upright standards 37 are shown fastened to scale platform 10 by bolts 38, said standards 37 being insulated from platform 10 and extend upward a distance to which is connected a plurality of wires 29 by a plurality of connections 29ª. Said connections 29ª are insulated from standards 37. Connected to the upper portion of standards 37 are a plurality of wires 39, said wires passing down and through insulations 34 in scale platform 10 and connecting with rotating springs 35ª. Said rotating springs 35 and 35ª are fastened to rotating plate 40 in any suitable manner, and are insulated therefrom. Said rotating plate 40 is fastened to the under side of scale platform 10 by bolts shown at 41. Fastened to frame 1 in any suitable manner and insulated therefrom is an electric plate 42 having grooves 43 therein. Said grooves are insulated apart as shown at 43ª. In said grooves rotating springs 35 and 35ª rotate. Connected to said plate 42 are electric wires 44. Said wires are insulated through said frame 1 by insulation shown at 45, said wires 44 connecting with outside electric wires not shown. A plurality of upright switch levers 46 are pivoted to scale platform 10 by pivots 47. Said switch levers 46 extend above and below scale platform 10 a distance. On the upper ends of said switch levers 46 are fastened a plurality of horizontal bars 48, said bars 48 being insulated from said switch levers 46. As cans or packages 15 are delivered to receiving platforms 14 the horizontal bars 48 are moved over by said cans or packages 15 until switch levers 46 have passed their upright position, when said switch levers cause said horizontal bars 48 to drop in between standards 37 and connections 29ª thereby closing the electric circuit to electric magnets 24 which causes plungers 26 to travel upward thereby opening supply valves 21 and thus filling cans 15 or packages from reservoir 16 to the required weight set on scale beams 13. When said scale beams 13 balance, electric circuit is broken at spring contact 30 which causes plunger 26 to drop down and close valves 21, thus stopping the flow of syrup or any other article being used to fill cans or packages placed thereunder. As cans or packages commence to move off from receiving platforms 14, the lower ends of switch levers 46 come in contact with cam 49 and thus carrying the lower ends of switch levers 46 inward, the same moving on pivot 47, breaks the electric contact at connection 29ª. Cans or packages 15 are fed to receiving platforms 14 by endless sprocket chain 50, said chain having a plurality of arms 51 attached thereto. These arms come in contact with cans or packages 15 in guide track 52 and carry said cans or packages 15 forward to where sprocket wheel 53, rotating on shaft 54, comes in contact with said cans or packages 15 and carry the same to receiving platform 14. Cans or packages 15 are removed from receiving platform 14 by coming in contact with removing bar 55, said bar being made of steel of the required length, width and thickness, and fastened to flange 56 of guide track 52 by bolts shown at 57. As cans or packages 15 are removed from receiving platforms 14 by removing bar 55, the same are taken away by revolving platform 58 rotating on shaft 59 to any other position required.

Having thus described my invention, what I claim as new, and desire to secure by Letters Patent, is—

1. In an electric automatic weighing device, the combination of a main frame, a driving shaft attached thereto, a driving pulley attached to said driving shaft, a loose pulley on said driving shaft, a bevel gear keyed to said driving shaft, an upright shaft, a bevel gear keyed to said upright shaft adapted to engage bevel gear on said driving shaft, a scale platform keyed to said upright shaft adapted to rotate therewith, a plurality of weighing scales fastened to said scale platform, a plurality of receiving platforms attached to said weighing scales each adapted to receive a can or package to be weighed, a circular revolving reservoir keyed to the upper end of said upright shaft, said circular revolving reservoir having a cover over the top thereof through which a stationary supply pipe is inserted, a plurality of supply pipes connected to the circular revolving reservoir, a plurality of regulating valves connected to the outer end of said supply pipes, a plurality of perpendicular arms fastened to said supply pipes, the upper ends of the same being bent at right angles a distance, a plurality of electric magnets connected thereto and insulated therefrom, a plurality of plungers adapted to connect with said electric magnets, a plurality of valve stems fastened to said plungers to which are connected valves, as and for the purpose described.

2. In an electric automatic weighing device, the combination of a main frame, a driving shaft, an upright shaft, a revolving reservoir keyed to said upright shaft adapted to rotate therewith, a scale platform keyed to said upright shaft adapted to rotate therewith, a plurality of weighing scales fastened to said scale platform adapted to rotate therewith, a plurality of receiving platforms connected to said scales adapted to receive cans or packages to be weighed, supply valves and means for operating the same, electric magnets and means for applying electric current thereto, plungers operating with said electric magnets adapted to open said supply valves, means for connecting and disconnecting said electric current to and from said electric magnets, an electric plate having grooves therein into which rotating springs rotate, electric wires connected to said electric plate and to an outside electric current, as shown and described.

3. In an electric automatic weighing device, the combination of a main frame, a driving shaft, an upright shaft, a revolving reservoir, a revolving scale platform, a plurality of weighing scales fastened to said revolving scale platform, a plurality of upright switch levers pivoted to said scale platform extending above and below said scale platform, a plurality of horizontal bars fastened to the upper end of said upright switch levers and insulated therefrom, means by which the electric circuit to said electric magnets are broken, a cam fastened to said main frame adapted to engage said switch levers, a pivot on which said switch levers move, a plurality of receiving platforms, means by which cans or packages are fed to said receiving platforms, a sprocket chain having arms attached thereto adapted to engage said cans or packages, a guide track having flanges, a revolving sprocket wheel adapted to engage said cans or packages and place the same on receiving platforms, a removing bar and means of fastening the same to guide track flanges, said bar being adapted to remove said cans or packages from said receiving platforms, a revolving platform to which said cans or packages are removed, as shown and described.

In testimony whereof I affix my signature, in presence of two subscribing witnesses, this 22 day of April, 1914.

ENOCH J. LANE.

Witnesses:
JOHN A. NAISMITH,
J. B. CAMBERS.